United States Patent [19]
Vishlitzky et al.

[11] Patent Number: 5,960,216
[45] Date of Patent: Sep. 28, 1999

[54] METHOD AND APPARATUS FOR INTERFACING TWO REMOTELY DISPOSED DEVICES COUPLED VIA A TRANSMISSION MEDIUM

[75] Inventors: Natan Vishlitzky, Brookline; Yuval Ofek, Hopkinton; Gadi Shklarsky, Brookline, all of Mass.

[73] Assignee: EMC Corporation, Hopkinton, Mass.

[21] Appl. No.: 08/601,733

[22] Filed: Feb. 15, 1996

Related U.S. Application Data

[63] Continuation of application No. 08/052,039, Apr. 23, 1993, Pat. No. 5,544,347.

[51] Int. Cl.⁶ .............................. G06F 13/00; G06F 13/42; G06F 13/20
[52] U.S. Cl. ................ 395/894; 395/200.46; 395/182.04
[58] Field of Search ...................................... 395/894, 853, 395/726, 861, 858, 182.04, 200.43, 200.46, 825, 851; 711/162

[56] References Cited

U.S. PATENT DOCUMENTS

| | | | |
|---|---|---|---|
| 5,544,347 | 8/1996 | Yanai et al. | 395/182.04 |
| 5,546,549 | 8/1996 | Barrett et al. | 395/861 |
| 5,553,302 | 9/1996 | Morrissey et al. | 395/853 |
| 5,659,756 | 8/1997 | Hefferon et al. | 395/726 |
| 5,680,580 | 10/1997 | Beardsley et al. | 395/858 |

*Primary Examiner*—Mark H. Rinehart
*Attorney, Agent, or Firm*—Wolf, Greenfield & Sacks, P.C.

[57] ABSTRACT

A method and apparatus for interfacing two ESCON compatible devices over a communication channel that is not dedicated solely to ESCON communication, such as a public communication network or links, for example, a T1 or T3 line. The devices may include a master storage device and a mirroring storage device disposed at remote locations. In one embodiment, the devices communicate using the ESCON protocol. In other embodiments, the devices communicate using modified versions of the ESCON protocol that have a reduced number of handshakes to improve performance.

58 Claims, 6 Drawing Sheets

| d(km) | BLOCK SIZE = 60K BYTES | | | BLOCK SIZE = 4K BYTES | | |
|---|---|---|---|---|---|---|
| | Fig. 4 T(ms) | Fig. 5 T(ms) | Fig. 6 T(ms) | Fig. 4 T(ms) | Fig. 5 T(ms) | Fig. 6 T(ms) |
| 1000 | 95 | 45 | 25 | 81 | 31 | 11 |
| 2000 | 175 | 75 | 35 | 161 | 61 | 21 |
| 3000 | 255 | 105 | 45 | 241 | 91 | 31 |
| 4000 | 335 | 135 | 55 | 321 | 121 | 41 |
| 5000 | 415 | 165 | 65 | 401 | 151 | 51 |
| 6000 | 495 | 195 | 75 | 481 | 181 | 61 |

*Fig. 7*

METHOD AND APPARATUS FOR INTERFACING TWO REMOTELY DISPOSED DEVICES COUPLED VIA A TRANSMISSION MEDIUM

This application is a continuation of Ser. No. 52,039, filed Apr. 23, 1993, now U.S. Pat. No. 5,544,347.

FIELD OF THE INVENTION

The present invention is directed to a method and apparatus for interfacing two remotely disposed devices over a transmission medium capable of transmitting data over long distances. The invention may be used, for example, to interface a master storage device of a host CPU to a remotely disposed mirroring storage device, particularly where the master storage device communicates with its host CPU using the ESCON protocol.

BACKGROUND OF THE INVENTION

ESCON is a standard computer system interface and protocol developed by International Business Machines (IBM). ESCON is applicable to an environment such as the one shown in FIG. 1, in which a central processing unit (CPU) 1 is coupled to a channel 3 having direct access to a main memory (not shown) of the CPU. The channel provides input/output capability to the CPU. More particularly, the channel 3 is coupled, over a link 5, to one or more control units 7, which each is in turn coupled to a plurality of I/O peripherals 9. Control unit 7 controls access to CPU 1, via channel 3, for each of the I/O peripherals 9, allowing each to have direct access to the CPU memory.

ESCON defines the interface and protocol for communicating over link 5 between channel 3 and control unit 7, and is described in detail, for example, in "ENTERPRISE SYSTEMS ARCHITECTURE/390—ESCON I/O INTERFACE", Third Edition (1992) published by IBM, which is incorporated herein by reference. Dedicated ESCON links have been provided so that control unit 7, along with its associated I/O peripherals 9, can be disposed at a location somewhat remote from CPU 1 and channel 3. However, these dedicated links have conventionally been limited to relatively short distances. For example, IBM states that its dedicated ESCON links are limited to approximately 60 km. Although this number may be conservative, it is believed that conventional dedicated ESCON links are limited to distances of approximately 80 km and less.

Conventional dedicated ESCON links between a channel and control unit suffer from two significant disadvantages. First, the above-described limit on the maximum supported distance may be insufficient for some applications. Second, it is often costly to implement these dedicated links because they are not part of a public communication network, and may not be capable of being implemented over pre-existing communication lines.

It is an object of the present invention to provide an improved interface for enabling communication between two remotely disposed devices, including ESCON compatible devices.

SUMMARY OF THE INVENTION

In accordance with one illustrative embodiment of the invention, a computer system is provided comprising a central processing unit (CPU), a first storage system that is coupled to the CPU so that the CPU can store information in the first storage system, a second storage system, and a communication link coupling the second storage system to the CPU so that the CPU can store information in the second storage system, the communication link comprising a data communication line operable within a public communication network and which are available from common carriers such as AT&T, MCI, Sprint, etcetera.

In another illustrative embodiment of the invention, a computer system is provided comprising a CPU, a first storage system that is coupled to the CPU so that the CPU can store information in the first storage system, means for establishing communication between the CPU and the first storage system in accordance with the ESCON protocol, a second storage system, and a communication link coupling the second storage system to the CPU so that the CPU can store information in the second storage system, the communication link having a distance greater than 80 km.

In another illustrative embodiment of the invention, a computer system is provided comprising a CPU, a first storage system that is coupled to the CPU so that the CPU can store information in the first storage system, means for establishing communication between the CPU and the first storage system in accordance with the ESCON protocol, a second storage system, a communication link coupling the first and second storage systems, and means for establishing communication between the first and second storage systems over the communication link in accordance with a communication protocol having fewer transactions per operation than the ESCON protocol.

In a further illustrative embodiment of the invention, a method of protecting against a loss of the data stored in the first storage system of a computer system including a CPU coupled to the first storage system is provided. The method includes the steps of: (A) disposing a second storage system at a location remote from a location of the first storage system; (B) coupling the second storage system to the first storage system with a data communication line selected from the family of public network carriers as T-carriers; (C) communicating the at least some of the data stored in the first storage system over the data line from the first storage system to the second storage system; and (D) storing the at least some of the data communicated over the data line in the second storage system so that the second storage system mirrors the at least some of the data stored in the first storage system.

In a further illustrative embodiment of the invention, a method is provided for communicating data frames from a first device to a second device over a data link coupling the first and second devices, the second device including a storage buffer capable of simultaneously storing no more than N data frames received over the data link from the first device. The method includes the steps of: (A) transmitting a request from the second device to the first device requesting that a number of data frames greater than N be transferred from the first device to the second device; and (B) receiving all of the number of requested data frames from the first device in a single data transmission.

In yet another illustrative embodiment of the invention, a method is provided for communicating data frames from a first device to a second device over a data link coupling the first and second devices, the second device including a storage buffer capable of simultaneously storing no more than N data frames received over the data link from the first device. The method includes the step of (A) transmitting a number of data frames greater than N over the data link from the first device to the second device in a single data transmission.

In a further illustrative embodiment of the invention, a device is provided for communicating data frames with another device over a data communication link. The device comprises a storage buffer capable of simultaneously storing no more than N data frames received over the data link from the other device, means for transmitting a request to the other device requesting that a number of data frames greater than N be transferred over the data communication link from the other device to the device, and means for receiving all of the number of requested data frames from the other device in a single data transmission.

BRIEF DESCRIPTION OF THE DRAWINGS

FIG. 7 is a table providing a comparison of the relative performance of the protocols shown in FIGS. 4–6.

DETAILED DESCRIPTION

The present invention is directed to a method and apparatus for enabling communication between two remotely disposed devices over a communication medium capable of transmitting data over long distances. One illustrative example of an application in which the present invention can be used is a remote data mirroring facility discussed below in connection with FIG. 2. However, it should be understood that the present invention can be employed in numerous other applications and system configurations, and is not limited to use in a remote data mirroring facility.

Figure 1:
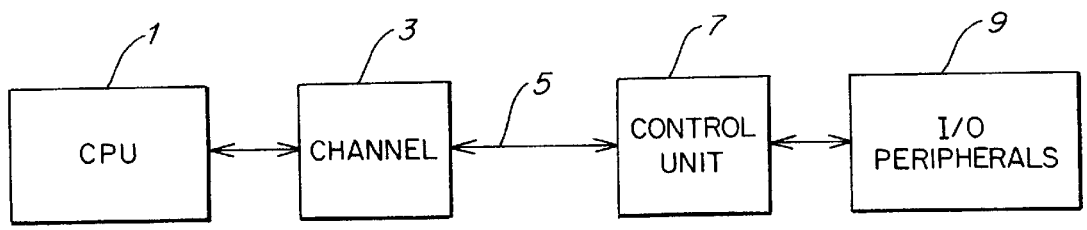
FIG. 1 is a block diagram of a conventional ESCON computer system environment.
Figure 2:
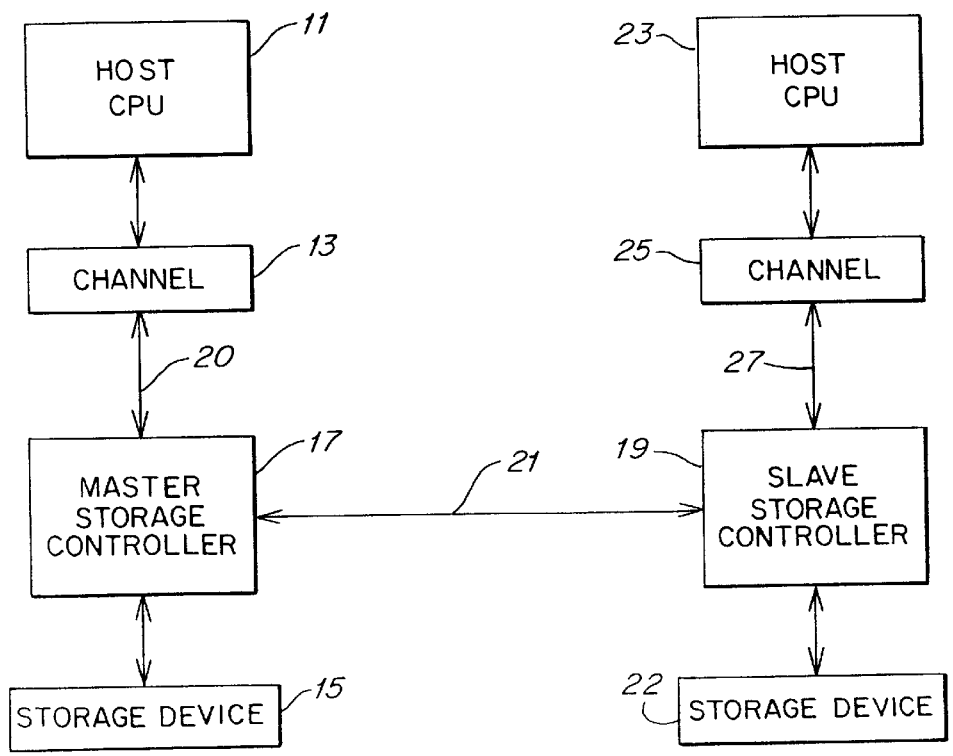
FIG. 2 is a block diagram of a master/slave remote data facility application in which the present invention can be used.

In the system shown in FIG. 2, a host CPU 11 and its associated channel 13 are coupled to a storage device 15 through a master storage controller 17. The storage device 15 may be a large disk drive providing main storage for the host CPU 11, or it may be a plurality of smaller disk drives arranged to perform the same function. An example of such a storage device is the SYMMETRIX line of disk arrays, available from EMC Corporation, Hopkinton, Mass. The channel 13 of the host CPU may communicate with the master storage controller 17 using the ESCON protocol, with the master storage controller performing the role of the control unit 7 (FIG. 1). Alternatively, the interface between the host CPU and the master storage controller 17 can be implemented using any of a number of other protocols, such as SCSI or Bus and Tag (B&T), which is an IBM standard.

The data stored on storage device 15 may be crucial to the operation of host CPU 11. Therefore, a contingency solution is desirable in the event that a problem is experienced with storage device 15, to ensure that the stored data is not lost and to minimize the risk of CPU 11 being down due to problems with the storage device. Potential problems with storage device 15 can include hardware and software errors that may make stored data unrecoverable, as well as catastrophic events such as an earthquake or other natural disaster that could result in the destruction of the storage device.

One solution for protecting the data stored in storage device 15 is to mirror the data in another storage device. FIG. 2 illustrates such a system, wherein the master storage controller 17 is coupled to a slave storage controller 19 and an associated storage device 22. As data is written to storage device 15, it can also be written to storage device 22. If storage device 15 is destroyed or experiences an error that renders stored data unrecoverable, the data can be retrieved from the mirroring storage device 22. As shown in FIG. 2, the slave storage controller 19 and storage device 22 can also serve as the main storage system for another host CPU 23, to which the storage system is coupled via a channel 25. Alternatively, the slave storage system can be dedicated solely to mirroring the data stored in the master storage system, without being coupled to another CPU.

The level of protection provided by the system shown in FIG. 2 is enhanced when the mirroring storage system (controller 19 and device 22) is disposed at a location remote from the main storage system (controller 17 and device 15), so that if a catastrophe occurs that destroys the main system, the likelihood of the mirroring storage system also being destroyed is greatly decreased. Thus, one illustrative application for the present invention is to implement the link 21 between the master and slave storage controllers 17 and 19 to enable the slave controller to be disposed a relatively long distance away from the master controller.

To enable communication between the master and slave storage controllers 17 and 19 over data link 21, a protocol was adopted. As stated above, in the remote mirroring storage application for the present invention, the storage controllers may communicate with their respective CPUs using the ESCON protocol. Thus, master storage controller 17 may be an ESCON compatible device that communicates over link 20 with the channel 13 of its host CPU using the ESCON protocol. Similarly, slave storage controller 19 may also be an ESCON compatible device so that in the configuration shown in FIG. 2 in which it is coupled to a second host CPU 23, the ESCON protocol is used to communicate over data link 27 with channel 25.

Figure 3:
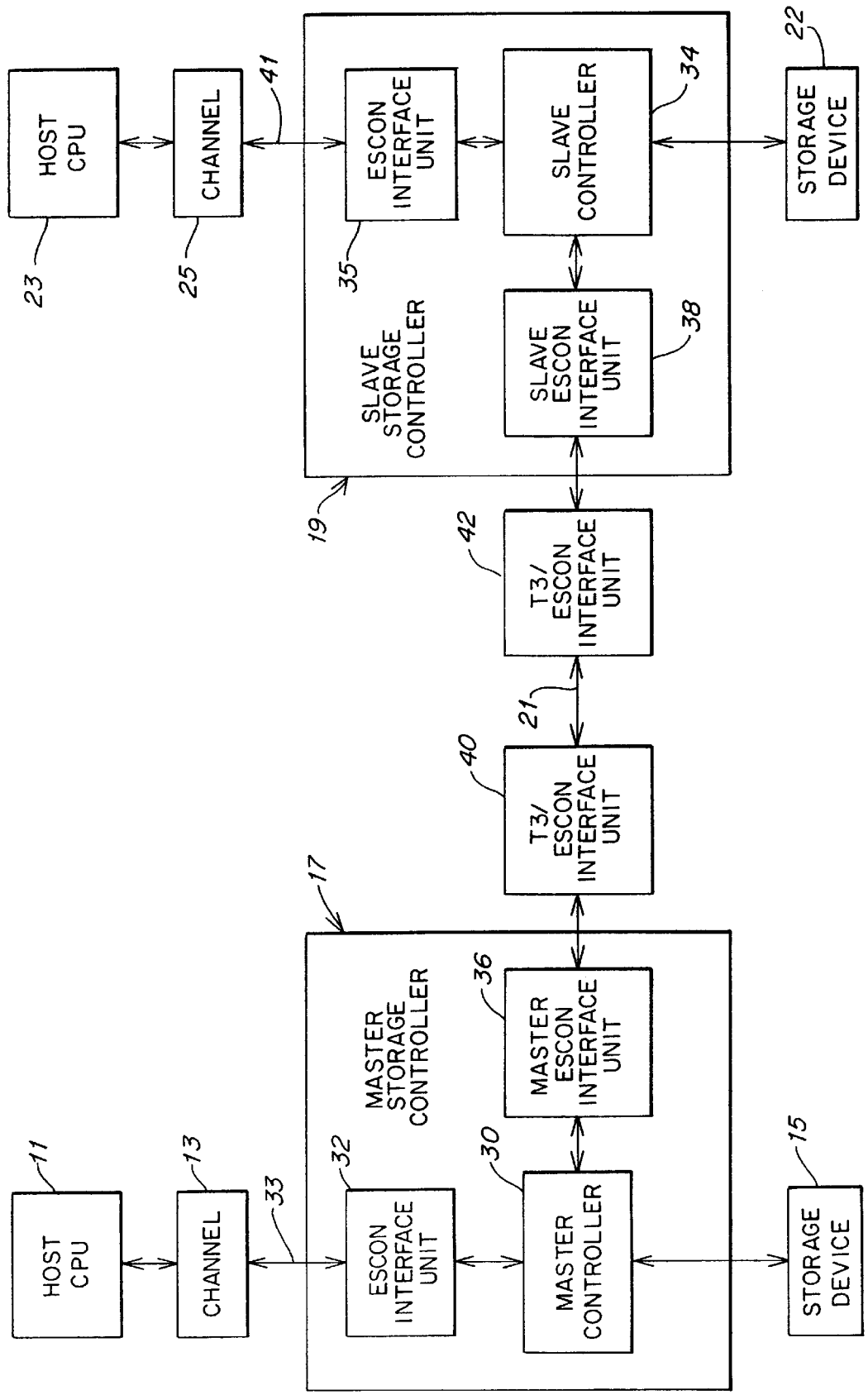
FIG. 3 is a block diagram of the system of FIG. 2 including interface units to implement the present invention.

The organization of each of the master and slave storage controllers and its ability to communicate with its respective channel (i.e., respectively channels 13 and 25 in FIG. 2) using the ESCON protocol is illustrated in FIG. 3. Master storage controller 17 includes a master controller 30, and an ESCON interface unit 32 that interfaces the controller with channel 13 over link 33. Together, the controller 30 and ESCON interface unit 32 perform the functions of the control unit 7 (FIG. 1) in the ESCON environment, enabling communication between host CPU 11 (FIG. 3) and storage device 15 (FIG. 3) using the ESCON protocol. Similarly, in the embodiment of the invention wherein the slave storage controller 19 is coupled to a local host CPU 23 (FIG. 3), the slave storage controller includes a slave controller 34 and an ESCON interface unit 35 that together perform the function of control unit 7 (FIG. 1) in enabling host CPU 23 and storage device 22 to communicate using the ESCON protocol over link 41. Although the links 33 and 41 between the storage controllers and their associated channels each is shown as a single path in FIG. 3, it should be understood each can include a number (e.g., six–eight) of parallel communication paths, explained below in connection with FIG. 3a.

Because each of the master and slave storage controllers typically has the capability of communicating with the channel of its local CPU using the ESCON protocol, it is desirable to also implement the communication link 21 between these storage controllers using an ESCON based protocol. Thus, in the embodiment of the present invention shown in FIG. 3, the master and slave storage controllers 17 and 19 are respectively provided with master and slave ESCON interface units 36 and 38, each of which is coupled to communication link 21. When data is transferred between the master and slave storage controllers, master ESCON interface unit 36 performs the role of the channel 3 (FIG. 1) in the ESCON environment, and slave ESCON interface unit 38 performs the role of control unit 7 (FIG. 1), enabling the master and slave storage controllers to communicate over communication link 21 using the ESCON protocol.

In the exemplary application of the present invention discussed above relating to the remote mirroring storage system, each of the CPUs is described as communicating with its associated storage device using the ESCON protocol. However, it should be understood that the invention is not limited in this respect. The present invention is directed to establishing communication between two remotely disposed devices over a public communication network, and when used to implement a remote mirroring storage system, is not limited in any respect to the protocol used to communicate between each CPU and its associated storage device. As discussed above, the protocol for communicating between the CPUs and their respective local storage devices can be any of a number of different protocols, e.g., SCSI or B&T.

As stated above, conventional dedicated ESCON links are generally known by those skilled in the art to be limited to approximately 60–80 km. To maximize the protection provided by the remote mirroring data storage facility against data loss resulting from destruction of the main storage facility, and to provide increased flexibility in the manner in which the system can be configured, it is desirable to provide a link 21 that enables the slave storage controller 19 and its associated storage device 22 to be disposed at distances greater than 80 km from the master controller 17 and storage device 15, and yet remain implemented using pre-existing public communication channels.

In one embodiment of the invention, a data communication line of the type leased by telephone service companies is used to implement the data link 21 between the master and slave storage controllers. Examples of such a data communication line include the family of T-carriers available in North America (e.g., T1, T3 and T5) and the family of CEPT communication links available in Europe (e.g., CEPT-1 and CEPT-3). For the purpose of illustration, the link 21 is discussed below as being implemented using a T3 line. However, it should be understood that the present invention is not limited to use with any particular type of data communication line, and can be used with any type of communication channel provided by a common carrier and operable within a public communication network.

T3 is a service provided by telephone service companies in which a subscriber pays a flat fee to lease exclusive use of a data communication link between two locations. The T3 line employs existing telephone lines, satellite links, etc. to provide high speed data transmission between the two points requested by the subscriber within the public communication network. Other high speed data transports are available from providers for use over public communication networks. It should be apparent that by using T3 or some similar available service to implement the data link 21 in a system such as the one shown in FIG. 3, the expense and time that would be incurred in implementing a conventional dedicated ESCON link between the master and slave storage controllers is avoided. Furthermore, the limitation on the distance over which dedicated ESCON links can extend is overcome, enabling link 21 to be extended for significantly greater distances, thereby providing increased flexibility in implementing a user's desired configuration and providing enhanced protection in the event of a natural disaster.

The master and slave ESCON interface units 36 and 38 shown in FIG. 3 are independent of the particular transmission medium used to implement communication channel 21. Therefore, depending upon the transmission medium used, it may be desirable to provide an additional interface unit between each of the storage controllers and the transmission medium, as discussed below. For the illustrative embodiment shown in FIG. 3 wherein communication channel 21 is implemented as a T3 line, T3/ESCON interface units 40 and 42 are provided to respectively interface the master and slave storage controllers 17 and 19 to the T3 line. A device for implementing the T3/ESCON interface units 40 and 42 is available from Data Switch Corporation, One Water View Drive, Shelton, Conn., and is sold under the model name 9800 MAX. This device is also capable of interfacing the storage controllers with a T1 line, as well as CEPT-1 and CEPT-3 lines.

As stated above, the present invention is not limited to any particular transmission medium. Thus, the particular type of interface unit used to interface the storage controllers to the communication channel 21 will vary depending on the transmission medium used for the application.

Figure 3A:
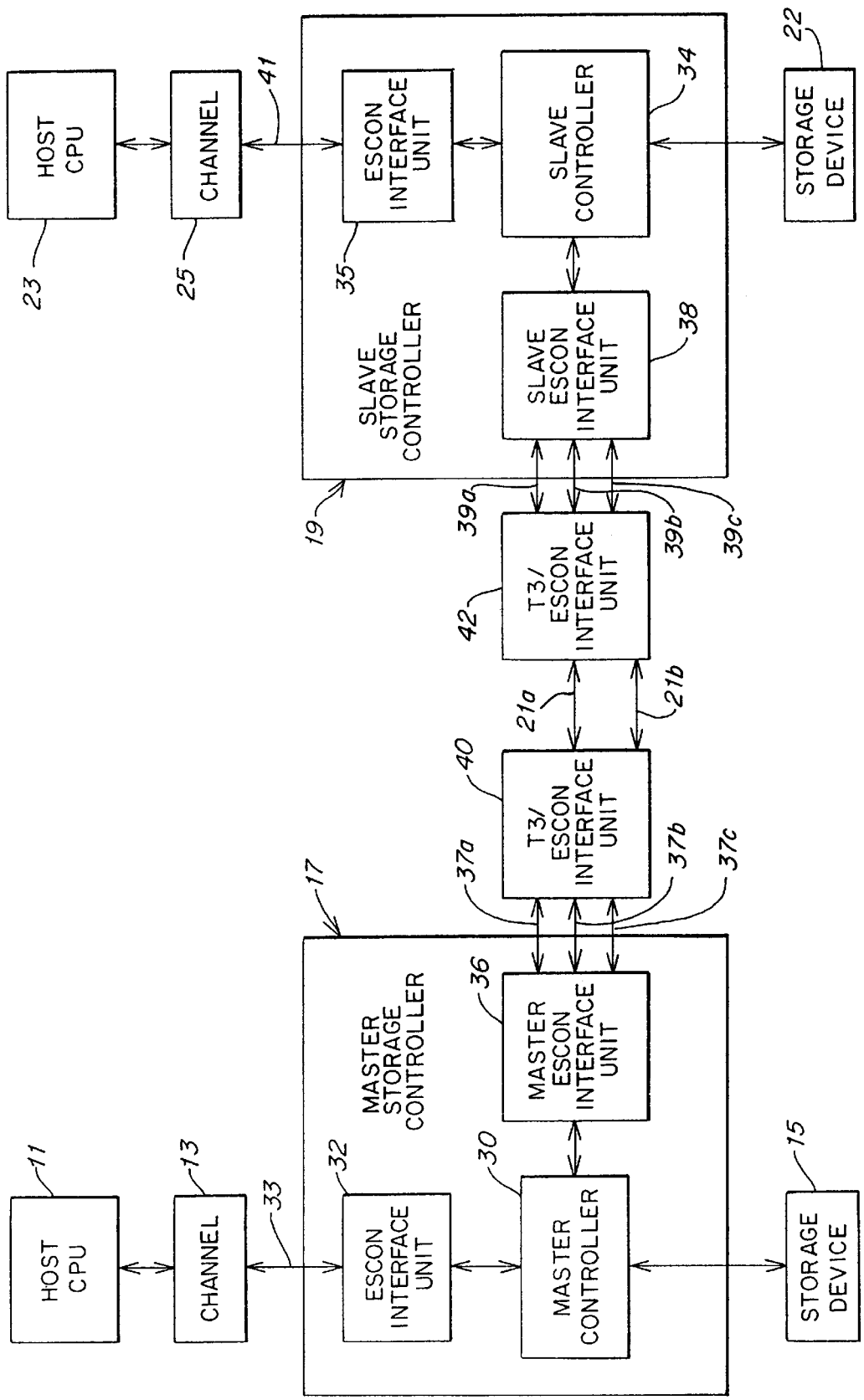
FIG. 3a is a block diagram of an alternate embodiment of the system of FIG. 3, with multiple communication paths being disposed between the master and slave devices.

Although the master and slave storage controllers are shown in FIG. 3 as being coupled by a single communication channel 21, it should be understood that communication between the remotely disposed devices can be carried out over a number of parallel communication channels, such as channels 21a and 21b shown in FIG. 3a. Just as storage device 22 is provided to mirror data contained in storage device 15, in the event of failure of device 15, communication channels are also susceptible to failure. Thus, multiple channels 21a and 21b can be used for fault tolerant reasons to decrease the likelihood of the system going down due a problem in a single communication channel, as well as to increase system bandwidth. Although two channels 21a and 21b are shown in FIG. 3a, any number (e.g., one, two, three or four) of parallel communication channels can be provided between the remote devices.

Multiple communication links 37a–c and 39a–c can also respectively be provided between the master and slave ESCON interface units and their corresponding T3/ESCON interface units 40 and 42. As shown in FIG. 3a, the number of communication links between an ESCON interface unit (e.g., 36 and 38) and its T3/ESCON interface unit need not correspond identically to the number of communication channels 21 between the two T3/ESCON interface units. Each T3/ESCON interface unit 40 and 42 may multiplex data, over the one or more communication channels 21a–21b, received from its respective communication link (37a–37c or 39a–39c). The data transmitted will then be demultiplexed on the receiving side of the data transmission. Thus, if the master ESCON interface unit 36 is the transmitting or sending unit, the data will be multiplexed for transmission on communication channels 21 and demultiplexed for receiving slave ESCON interface unit 38, and vice versa. This multiplexing may be performed using commercially available TDM multiplexing or other known multiplexing techniques. Load balancing capability may also be provided in the T3/ESCON interface units 40 and 42. For example, if three communication links 37a–37c are provided between master ESCON interface unit 36 and T3/ESCON interface unit 40, and two communication channels 21a–b of differing bandwidths are provided between T3/ESCON interface units 40 and 42, interface unit 40 balances the loads transmitted over channels 21a and 21b to make the best use of available bandwidth, without spreading the load necessarily evenly among the communication channels 21a–21b. In addition, while interface units 36 and 38 are shown in FIG. 3a within a single unit, it is to be understood that units 36 and 38 may comprise more than one of such interface units within one or both storage controllers 17 or 19. This is for the purposes of redundancy if one ESCON interface unit fails and to provide greater throughput of data from master controller 30. In this event, data communicated over communication channel 21 of FIG. 3 may be multiplexed from the plurality of ESCON interface units. Thus, the present invention contemplates the use of one or a plurality of communication channels, one or a plurality of communication links and one or a plurality of master ESCON interface units.

As will be appreciated from the discussion below, when data is transferred between devices using the ESCON protocol, information frames acknowledging receipt of the data are required by the protocol within a certain time period. This handshaking is used to ensure that transmitted data frames are not lost. When a dedicated ESCON communication link is provided between two remotely disposed devices, the propagation delay over the communication link may present problems in ensuring that acknowledgment frames will be received in the time periods required by ESCON. To address this problem, devices have been developed for interfacing two remotely disposed devices over a dedicated ESCON link. The interface devices have the capability of collecting and storing data, and of emulating the handshaking frames required between the channel 3 and control unit 7 (FIG. 1) to implement the ESCON protocol.

In accordance with the present invention, the interface units 40 and 42 disposed between the storage controllers (17 and 19) and communication link 21 do not emulate the channel 3 or control unit 7, and do not actively participate in the ESCON protocol in any way. The master and slave controllers generate all of the signals necessary to implement the protocol for communicating therebetween over communication channel 21. The interface units 40 and 42 merely interface the master and slave storage controllers to the particular communication medium used for the application.

The present invention provides several different protocols for implementing the interface between two ESCON compatible devices (e.g., the master and slave storage controllers) over a general purpose transmission medium (e.g., T3). As is explained in detail below, in one embodiment of the invention, the ESCON compatible devices communicate over the transmission medium using the ESCON protocol. In other embodiments, the ESCON protocol is modified to achieve improved performance.

The ESCON protocol supports a number of different operations between the channel 3 and control unit 7 (FIG. 1). An example of one such operation is discussed herein to illustrate the operation of devices using the ESCON protocol and the manner in which the protocol is modified in some embodiments of the invention to improve performance. However, it should be understood that the present invention is not limited to this single operation, and that each of the operations supported by ESCON is implemented in a similar fashion.

In ESCON, the transfer of data from CPU 1 to control unit 7 (FIG. 1) is referred to as a write operation, and the transfer of data from the control unit to the CPU is referred to as a read operation. Data is transferred using a maximum frame size that is negotiated by the channel 3 and control unit 7 during initialization. An example of a typical ESCON operation is a write operation of 64 k bytes of data from CPU 1 to control unit 7 (FIG. 1). For purposes of the discussion below, it is assumed that the maximum frame size negotiated prior to execution of the command is 1 k bytes.

Figure 4:
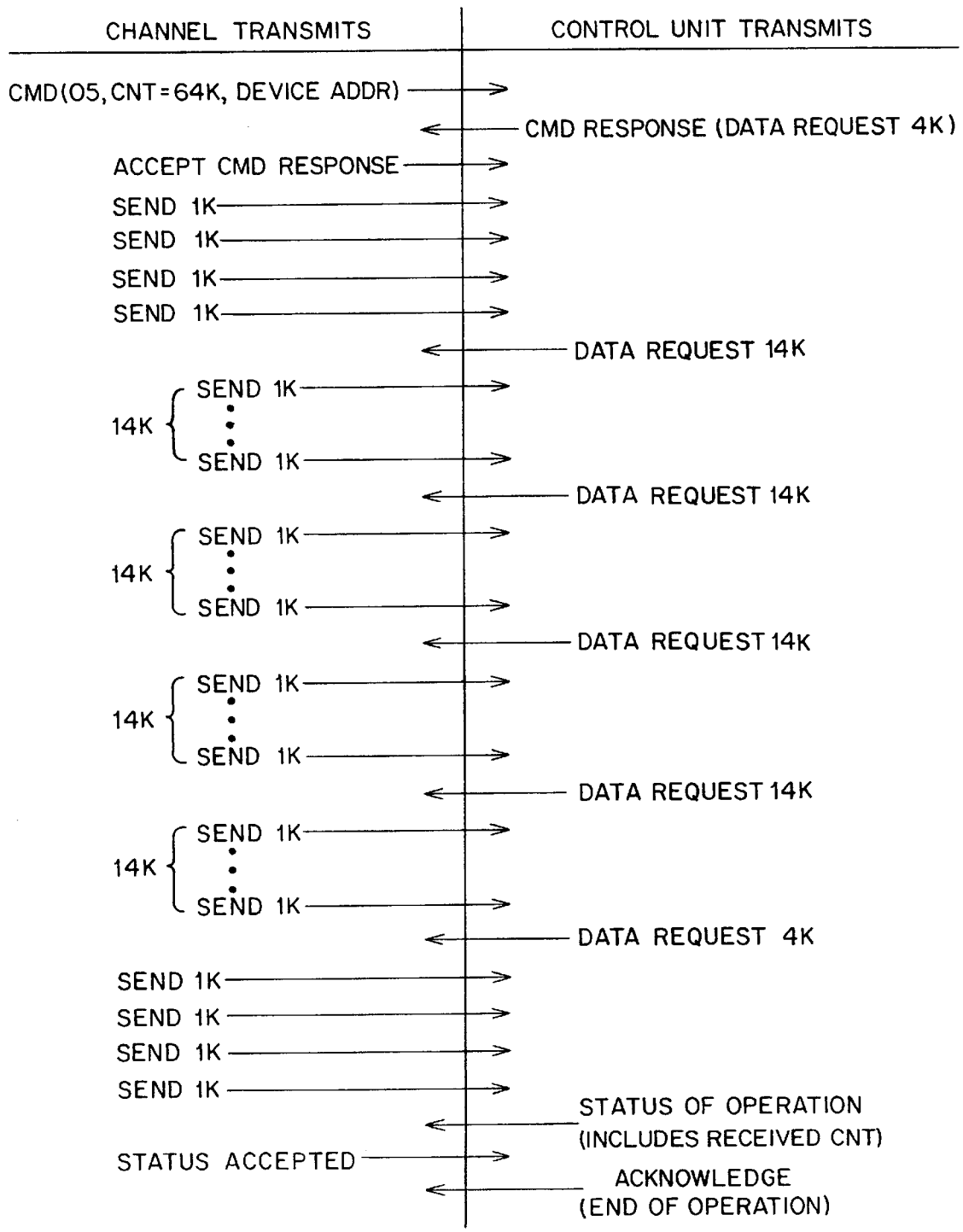
FIG. 4 illustrates a communication protocol in accordance with one embodiment of the present invention.

FIG. 4 illustrates the handshaking that occurs between the channel 3 and control unit 7 during the execution of the write 64 k byte operation using the ESCON protocol. It should be understood that during read operations, the roles of the channel and the control unit in implementing the ESCON protocol are essentially reversed, such that each of the control unit and the channel have the capability of generating all of the handshaking frames required by the ESCON protocol.

Referring to the example of FIG. 4, a command is initially sent from the channel to the control unit specifying the operation to be performed. The command includes a command field including a code for the command to be executed, which is shown as "05" in the illustrative example of FIG. 4. For a write command such as this, a count (i.e., CNT) is provided specifying the number of bytes to be transferred, which is 64 k in the example shown. Finally, the address of the receiving device is specified to designate which of the I/O peripherals 9 (FIG. 1) is to receive the data. When used to implement a system such as the one shown in FIG. 3 wherein only one control unit (slave ESCON interface unit 38) and a single peripheral (storage device 22) are coupled to the channel (master ESCON interface unit 36), the address necessarily designates the peripheral.

Once the command is received, the control unit returns a command response frame indicating that the operation can begin. When the command is a write operation, the control unit also returns a data request specifying the number of bytes of data it initially has the capacity to receive. For example, the control unit may not have sufficient buffer storage to receive all of the data to be transferred by the operation, so that the control unit could not store all of the data if it was transferred at once. By specifying the amount of data it is capable of receiving, the control unit ensures that the channel does not transmit more data than the control unit can process, which might result in a loss of data. In the example shown in FIG. 4, the initial data request specifies that the control unit can initially receive 4 k bytes of data.

Once the command response and data request are received by the channel, the channel transmits an accept command response frame to the control unit along with the requested 4 k bytes of data, which are transmitted in separate frames of 1 k bytes each as specified by the negotiated maximum frame size. Once the last of the 4 k frames is received by the control unit, the control unit transmits a second data request, requesting the amount of data that it has the capacity to receive at that time, specified as 14 k bytes of data in the example shown in FIG. 4. The channel responds to receipt of the data request by transferring the requested 14 k bytes of data in fourteen separate frames of 1 k bytes each. In this manner, through the issuance of separate data requests, the control unit controls the pacing of the data frames transmitted from the channel during the write operation, ensuring that the control unit has the capacity to process each received data frame so that none is lost.

In the example shown in FIG. 4, the last data request issued by the control unit requests 4 k bytes of data. After the last frame of 1 k bytes is received by the control unit, the control unit transmits to the channel a status of operation frame, which includes information indicating the number of data frames received by the control unit. The channel checks the received count specified in the status of operation frame to ensure that it equals 64 k, indicating that no data frames were lost. After the status of operation frame is checked by the channel, the channel returns a frame indicating that the status was accepted. Finally, after the status accepted frame is received by the control unit, the control unit returns an acknowledge frame to the channel which ends the operation.

As should be appreciated from an examination of FIG. 4, the ESCON protocol requires a significant amount of handshaking between the channel and control unit. A number of commands, data requests, status indications, acceptance frames and the acknowledge frames (collectively "transactions") are transmitted in addition to the data frames, thereby decreasing the performance of the system when executing the operation. As illustrated below, the magnitude of the performance degradation due to this handshaking varies depending upon the propagation delay through the transmission medium between the channel and control unit.

For example, if it is assumed that the transmission rate through the medium that implements the data link between the channel and control unit is one data frame of 1 k bytes in 55 $\mu$sec, and the propagation delay through the transmission medium is 25 $\mu$sec (equal to approximately 5 km for a fiber optic cable having a propagation delay of approximately 5 $\mu$sec/km), the total data transferral time for the operation of FIG. 4 is 3520 $\mu$sec (64×55 $\mu$sec), the total propagation delay for the six data transfers is 150 $\mu$sec (6×25 $\mu$sec), and the total propagation delay for all of the transactions is 250 $\mu$sec (10×25 $\mu$sec), with no propagation delay being attributed to the accept command response transaction because it is transferred along with the first block of data. Thus, the total time to execute the operation is 3920 $\mu$sec. The handshaking required by the ESCON protocol results in ten transactions, the time penalty for which accounts for approximately 6.5% of the total time for the operation using the assumptions provided above.

As the distance between the channel and control unit is increased, the propagation delay through the transmission medium also increases, resulting in a significant increase in the percentage of the total operation time attributable to the transactions. For example, if it is assumed that the propagation delay through the transmission medium is increased by a factor of ten to 250 $\mu$sec, then the time for the total operation includes the same 3520 $\mu$sec for data transmission through the medium, 1500 $\mu$sec attributable to propagation delay for the six data transfers across the data link (6×250 $\mu$sec), and 2500 $\mu$sec attributable to propagation delay of the transactions across the data link (10×250 $\mu$sec), resulting in a total operation time of 7520 $\mu$sec. Thus, making these assumptions, it is seen that the time penalty due to propagation delay associated with the transactions increases to over 33% of the total operation time.

As seen from the foregoing, as the propagation delay through the transmission medium increases, performance degradation of the operation due to the transactions employed by the ESCON protocol greatly increases. Therefore, in a number of alternate embodiments of the present invention, communication between ESCON compatible devices over a general purpose data link (e.g., T3) is performed using protocols specifically developed by the applicants. These protocols are similar in some respects to ESCON. However, in these alternate embodiments of the invention, the ESCON protocol has been modified to reduce the number of transactions between the channel and control unit, thereby increasing performance.

Figure 5:
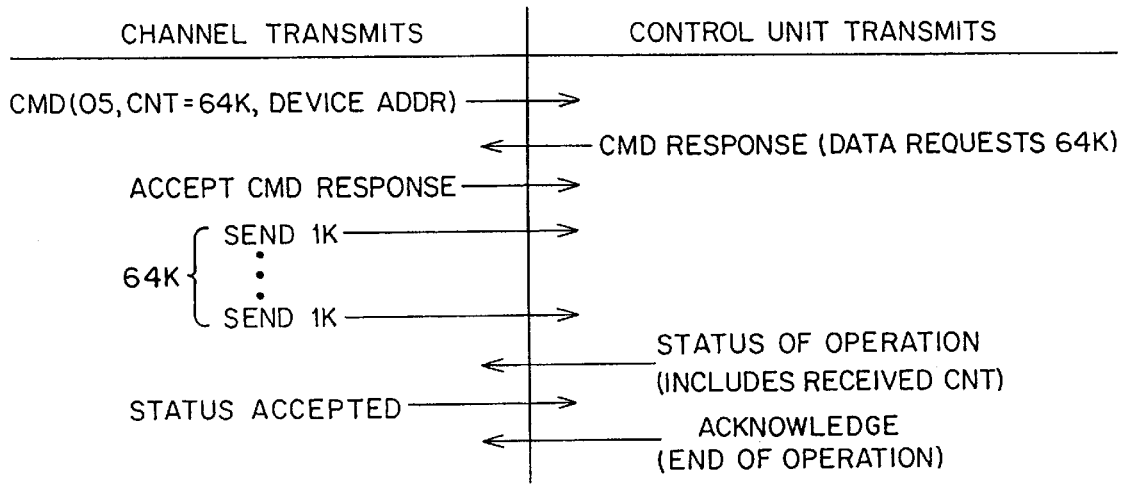
FIG. 5 illustrates an alternate communication protocol in accordance with another embodiment of the present invention.

In one embodiment of the invention illustrated in FIG. 5, a modified protocol is employed wherein data requests are not limited to the current capacity of the control unit. Rather, when a write command is received from the channel, the control unit simply requests that all of the data frames for the operation (e.g., 64 k bytes in the example of FIG. 5) be transferred in a single data transmission. As used herein, the reference to a single data transmission indicates that the transmitted information (e.g., data frames, command frames, acknowledgment frames or status frames) is transmitted as a block that requires only one propagation delay through the transmission medium between the channel and the control unit, without any gaps in the transmitted frames and without any frames being returned from the receiving device (i.e., channel or control unit) until after the transmission is completed. It should be immediately apparent that the modified protocol of FIG. 5 provides for improved performance in relation to the embodiment of FIG. 4 through the reduction in the number of transactions and separate data transmissions required. Using the example provided above wherein the transmission time for 64 k bytes of data through the transmission medium is 3520 $\mu$sec and the propagation delay over the data link is 250 $\mu$sec, the total time for the write operation using the protocol of FIG. 5 is 3520 $\mu$sec for data transmission, 250 $\mu$sec for the propagation delay of the single data transmission and the accept command response frame that is transmitted therewith, and 1250 $\mu$sec (i.e., 5×250 $\mu$sec) for propagation delay attributable to the remaining five transactions, resulting in a total operation time of 5020 $\mu$sec, and a 33% performance improvement over the protocol of FIG. 4. This improvement results from the reduction in the number of separate data transfers, as well as the reduction in the number of transactions. The penalty incurred due to propagation delay associated with the transactions falls to approximately 25% in this example using the protocol shown in FIG. 5.

It should be appreciated that the increased performance achieved by the protocol of FIG. 5 results from modifying the ESCON protocol so that the receiving device (i.e., the control unit for the write operation of FIG. 5) does not maintain control over the pacing of the data transfer, but rather, simply requests that all the data for the operation be transferred at once. In a conventional system wherein a dedicated ESCON link is provided between a channel and control unit, the protocol of FIG. 5 may have resulted in significant errors and data frame loss. For example, if the control unit in the example of FIG. 5 has buffers capable of storing only 14 k bytes, the receipt of any number of data frames in excess of 14 k bytes at a rate exceeding that at which the control unit can process received data frames would result in lost frames. A conventional dedicated ESCON link may be capable of transferring data frames at a rate of approximately twenty megabytes/sec. Thus, if the control unit cannot process received frames at that rate, data frames would frequently be lost if the protocol of FIG. 5 was used in a conventional ESCON system. Since the ESCON protocol is typically used to handle communication between a CPU 1 and a control unit 7 as shown in FIG. 1, the loss of data frames could be a serious error, resulting in interruption of the CPU.

As seen from the foregoing, the protocol shown in FIG. 5 may not be suitable for all ESCON applications. However, this protocol is suitable for an application, such as the one shown in FIG. 3, wherein the rate of transmission over the communication link 21 between two ESCON compatible devices is less than or equal to the rate at which the ESCON compatible devices can process received data frames. For example, a T3 data line transfers data at a rate of approximately 4.4 megabytes/sec. A storage controller such as the master and slave controllers in FIG. 3 can typically process received data frames at a significantly faster rate (e.g., 15–20 megabytes/sec). Therefore, when data is transferred between the master and slave storage controllers in the embodiment of FIG. 3, a data request for the entire amount of data for the operation can be issued without a significant risk that data will be lost, because the receiving controller can process the received data frames at a rate that exceeds that at which the communication medium can transfer them.

Although the risk of data frame loss may be small when the protocol of FIG. 5 is used in an application wherein the coupled devices can process received data frames at a rate that exceeds the transmission rate of the communication link, the removal of the ability of the receiving device to pace the data transfer (as illustrated in FIG. 4) may occasionally result in some data frames being lost when the receiving device is busy and cannot process received frames at its maximum rate. However, in a system such as the one shown in FIG. 3, the loss of data frames between the master and slave storage controllers is not as significant an error as when data is lost when transferred from one of the host CPUs to its associated storage device. Particularly, the lost data can simply be retransmitted between the master and slave storage controllers, without interrupting operation of the CPUs. Thus, although some data frames may be occasionally lost using the protocol of FIG. 5, the penalty incurred to recover from such an error may be relatively insignificant for some applications, and may be outweighed by the performance gains provided by this protocol.

Error checking and recovery is conventionally performed in one of two ways. When a large block of data is transferred (e.g., 64 k bytes in the examples above), error checking and recovery can be done solely on the block level, such that if an error occurs in any of the transmitted bytes of data in the block, the entire block is re-transmitted. This type of error checking is generally employed with a very reliable transmission medium through which errors are infrequent. Alternatively, error checking and retransmission can be performed on a lower level (e.g., the 1 k byte frames discussed in the example above). Thus, if the transmission medium is relatively unreliable so that more frequent errors occur, only a smaller frame of data need be re-transmitted to recover from the error, so that a large performance penalty is not incurred in re-transmitting the entire block.

Dedicated ESCON links are very reliable, so that error checking and recovery is generally not performed at a low level on those links. However, the present invention is capable of being performed using many different types of transmission media, some of which (e.g., T3) may be less reliable than a dedicated ESCON link. Therefore, in accordance with one embodiment of the invention, the ESCON interface units 40 and 42 (FIG. 3) perform error checking and recovery at a lower level than the blocks of data transferred by the ESCON commands, so that when errors occur, a significant performance penalty is not incurred in re-transmitting the entire block of data.

Figure 6:
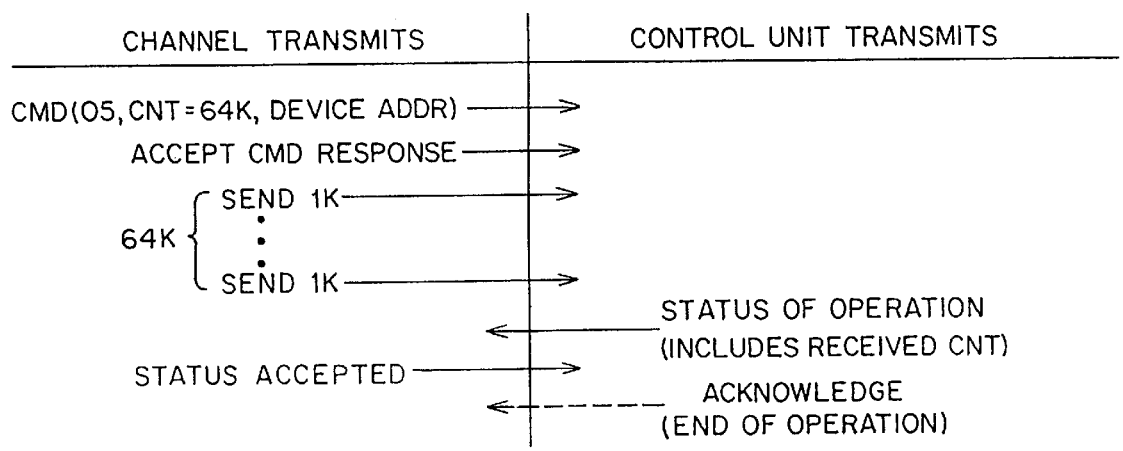
FIG. 6 illustrates a further alternate protocol in accordance with yet another embodiment of the present invention.

An additional alternate embodiment of the invention is shown in FIG. 6, wherein the number of transactions is further reduced from the embodiment shown in FIG. 5. In the embodiment of FIG. 6, the control unit does not return a command response, and the channel transfers the accept command response frame and all of the data along with the command in a single transmission. In this manner, two propagation delays through the transmission medium are saved, so that no performance penalty is incurred waiting for the command to be transmitted from the channel to the control unit, and for the command response frame to be transmitted back to the channel.

In a system such as the one shown in FIG. 3, only two devices are connected together over the communication channel 21. Therefore, the ESCON compatible device that transmits a command (e.g., master ESCON interface unit 36 that acts as the channel in the embodiment of FIG. 3) in this system is assured that the receiving device is the intended recipient (e.g., slave ESCON interface unit 38 that acts as the control unit). Thus, when an operation is performed between the two ESCON compatible devices over the communication channel 21 using the protocol of FIG. 6, the device that initiates the operation transmits the command, the accept command response frame and the data in one transmission, and then simply assumes that it will be received and processed by the receiving device. If the command is not received or processed properly, the transmitting device is notified via the information contained in the status of operation frame, or by the non-receipt of the status of operation frame.

Another difference between the protocols of FIGS. 5 and 6 is that although the acknowledge frame is sent by the control unit in FIG. 6, the channel does not wait to receive the acknowledge frame before beginning the next operation. This is indicated in FIG. 6 by the transmission of the acknowledged frame being represented as a dotted line. Thus, although the status accepted and acknowledge frames are transmitted, a savings of two propagation delays is achieved as compared with the protocol shown in FIG. 5, because after the status accepted frame is transmitted, the channel begins the next operation without waiting for the status accepted frame to arrive at the control unit and then for the acknowledge frame to be returned to the channel.

As discussed above, the status accepted frame is provided in the ESCON protocol because a channel may not necessarily be ready to receive status from a control unit when it is sent. Thus, until it receives the status accepted frame, the control unit continues to re-transmit the status frame. In the embodiment of the present invention wherein only a single control unit is associated with the channel (e.g., master and slave storage controllers 17 and 19 of FIG. 3), the channel (e.g., master ESCON interface unit 36) will never be busy, and will always be ready to accept a status of operation frame. Thus, the additional handshaking provided in the ESCON protocol is removed in the embodiment of FIG. 6, enabling performance improvements to be achieved for applications wherein this handshaking is unnecessary.

If an error occurs in an operation that results in the transmitting device (e.g., the channel in FIG. 6) not transmitting the status accepted frame, the receiving device (e.g., the control unit in FIG. 6) will not return the acknowledge frame and will continue to wait for the status accepted frame. If the transmitting device proceeds to a next operation and transmits a new command to the receiving device, the receiving device will report an error associated with the preceding command due to the failure to receive the status accepted frame. Thus, the error will eventually be detected upon the attempt to execute the next command. Therefore, the transmitting device need not await receipt of the acknowledge frame before beginning the next operation.

It should be appreciated that the protocol of FIG. 6 results in a further performance improvement over the embodiment of FIG. 5 by further reducing the number of transactions.

Using the parameters of the example described above in comparing the relative performance of the protocols of FIGS. 4 and 5, the time for transmission of 64 k bytes of data through the transmission medium is 3520 μsec, the single propagation delay associated with transferring the data, the command and the accept command response frame across the communication link is 250 μsec, and the propagation delay for transmitting the status of operation frame is 250 μsec, resulting in a total time for the operation of 4020 μsec. This provides an approximately 23.7% improvement over the performance of the protocol of FIG. 5 for this example, and results in a reduction of the percentage of time attributable to the transactions to approximately 6.2%.

As seen from the foregoing, in some embodiments of the invention, performance improvements are achieved by modifying the ESCON protocol to reduce the handshaking required. To understand the purpose for each of the handshaking signals in ESCON, which was developed as a general purpose protocol, the standard should be reviewed in detail. However, as should be appreciated from the foregoing, for a number of applications such as those described above, not all of the handshaking signals required by ESCON are necessary, and some can be eliminated to achieve improved performance.

It should be recognized that by removing some of the handshaking levels from the ESCON protocol, error detection may occur less frequently, resulting in potentially greater recovery penalties when an error is detected. The ESCON protocol provides for a fairly sophisticated error recovery system. However, in accordance with the embodiments of the present invention shown in FIGS. 4–6, a far simpler technique is employed. Whenever an error is detected at any stage of any command, the command is simply re-executed from the beginning.

FIG. 7 is a table useful in comparing the performance characteristics of the embodiments of FIGS. 4–6. These performance characteristics are based upon a few assumptions. First, it is assumed that the rate of data transmission through the communication link between the devices is four megabytes/sec, which is roughly the speed of a T3 line. Second, it is assumed that the propagation delay through the medium is equal to 5 μsec per 1 km, which is approximately the speed of data transmission over a fibre optic cable. Given these assumptions, the total time (T) in milliseconds for an operation across the transmission medium for any of these protocols is defined by the formula shown below, wherein BS represents the block size of the data transfer in k bytes, d represents the distance of the transmission line in kilometers, and k represents the number of propagation delays that are involved in an operation.

$$T(ms) = BS/4 + (k \times 5d/1000)$$

The block size (BS) is divided by four because the rate of data transmission through the line is four megabytes/sec. Using the illustrative command depicted in FIGS. 4–6, k equals sixteen for the embodiment of FIG. 4, six for the embodiment of FIG. 5, and two for the embodiment of FIG. 6. The distance d is multiplied by five in the formula to represent the propagation delay of five microseconds per km, and is divided by 1000 to convert the unit of measure from microseconds to milliseconds.

As can be seen from an examination of FIG. 7, the reduction in the number of propagation delays (i.e., k in the formula above) in the embodiments of FIGS. 5 and 6 significantly reduces the time of an operation, particularly as the distance d through the transmission medium increases.

Each device that communicates using the protocols of the present invention (e.g., the master and slave ESCON interface units 36 and 38 in FIG. 3) may include a processor that is programmed by software to generate and respond to the handshaking signals discussed herein which implement the protocols of the present invention. In one embodiment of the invention, the processors may be selected from the Motorola 68xxx family of processors. It should be understood that a number of other types of suitable processors can alternatively be used. Furthermore, although a programmed processor provides a simple and straightforward implementation of a device for communicating using the protocols of the present invention, it should be understood that such a device can also be implemented using dedicated hardware.

As discussed above, the protocols of the present invention are well suited to use with a system such as the one shown in FIG. 3, wherein a mirroring slave storage controller is disposed at a location remote from the master storage controller. The master and slave storage controllers can be connected via a T1 or T3 line, or any other communication medium that enables the slave to be disposed remotely from the master. The master ESCON interface unit implements and performs the role of the channel 3 (FIG. 1) and the slave ESCON interface unit serves the role of the control unit 7 (FIG. 1) in implementing the protocols shown in FIGS. 4–6. The slave ESCON interface unit is the only control unit coupled to the channel implemented by the master ESCON interface unit 36. Thus, the protocols shown in FIGS. 5 and 6 have been found to work successfully in such a system, and any errors resulting from the reduced handshaking in the modified protocols have not been found to be significant in view of the substantial performance improvements provided by these protocols. Using the protocols of the present invention, communication links being significantly longer than dedicated ESCON links can be used, with the only limitation on distance being the manner in which the performance requirements of the system are affected by the increased propagation delay that results from increased distance. Thus, communication links ranging from 0 km to, for example, 6000 km can be implemented using the present invention.

Although the present invention has been discussed above in connection with a single write command, and in the context of a system for providing a remotely located slave storage controller, it should be understood that the present invention is not so limited. The protocol for executing the remaining commands supported by ESCON can be modified in a similar way. Furthermore, the present invention can be used to interface any remotely disposed devices over a general purpose communication medium that need not be dedicated to ESCON communication, and is not limited to providing a remote data storage mirroring facility.

It should be understood the various changes and modifications of the embodiments shown in the drawings and described in the specification may be made within the scope of the invention. It is intended that all matter contained in the above-description and shown in the accompanying drawings be interpreted in an illustrative and not in a limiting sense. The invention is limited only as defined in the following claims and the equivalents thereto.

What is claimed:

1. A computer system comprising:
   a central processing unit (CPU);
   a first storage system that is coupled to the CPU so that the CPU can store information in the first storage system;
   a second storage system; a communication link coupling, via the first storage system, the second storage system to the CPU so that the CPU can store information in the second storage system, the communication link comprising a data communication line operable within a public communication network; and means for establishing communication between the first and second storage systems over the communication link in accordance with a communication protocol having fewer transactions per operation than the ESCON protocol.

2. The computer system of claim 1, further including mirroring means, distributed between the first and second storage systems, for mirroring at least some of the information stored in the first storage system in the second storage system.

3. The computer system of claim 2, wherein the mirroring means includes:

first means, disposed in the first storage system, for transmitting the at least some of the information stored in the first storage system to the second storage system; and second means, disposed in the second storage system, for storing in the second storage system the at least some of the information transmitted from the first storage system.

4. The computer system of claim 3, wherein the mirroring means further includes:

third means, disposed in the first storage system, for transmitting a request to the second storage system to transmit at least one information frame stored in the second storage system to the first storage system; and fourth means, disposed in the second storage system, for transmitting the at least one information frame to the first storage system in response to receipt of the request.

5. The computer system of claim 1, further including means for establishing communication between the CPU and the first storage system in accordance with the ESCON protocol.

6. The computer system of claim 5, wherein the communication link extends between the first and second storage systems such that the second storage system is coupled to the CPU via the first storage system.

7. The computer system of claim 6, further including mirroring means, distributed between the first and second storage systems, for mirroring at least some of the information stored in the first storage system in the second storage system.

8. The computer system of claim 6, further including means for establishing communication between the first and second storage systems over the communication link in accordance with the ESCON protocol.

9. The computer system of claim 1, further including means for establishing communication between the first and second storage systems over the communication link in accordance with the ESCON protocol.

10. The computer system of claim 9, further including mirroring means, distributed between the first and second storage systems, for mirroring at least some of the information stored in the first storage system in the second storage system.

11. The computer system of claim 10, further including means for establishing communication between the CPU and the first storage system in accordance with the ESCON protocol.

12. The computer system of claim 1, wherein the CPU is a first CPU, and wherein the system further includes a second CPU coupled to the second storage system.

13. The computer system of claim 1, wherein the data communication line is selected from the family of T-carriers.

14. A computer system comprising:

a central processing unit (CPU);

a first storage system that is coupled to the CPU so that the CPU can store information in the first storage system;

means for establishing communication between the CPU and the first storage system in accordance with the ESCON protocol;

a second storage system;

a communication link coupling the first and second storage systems; and means for establishing communication between the first and second storage systems over the communication link in accordance with a communication protocol having fewer transactions per operation than the ESCON protocol.

15. The computer system of claim 14 further including mirroring means, distributed between the first and second storage systems, for mirroring at least some of the information stored in the first storage system in the second storage system.

16. The computer system of claim 14, wherein the communication link comprises a data line selected from the family of T-carriers, and wherein the computer system further includes mirroring means, distributed between the first and second storage systems, for mirroring at least some of the information stored in the first storage system in the second storage system.

17. The computer system of claim 14, wherein the communication link has a distance greater than 80 km.

18. The computer system of claim 17, further including mirroring means, distributed between the first and second storage systems, for mirroring at least some of the information stored in the first storage system in the second storage system.

19. In a computer system including a central processing unit (CPU) and a first storage system that is coupled to the CPU so that the CPU can store data in the first storage system, a method of protecting against a loss of at least some of the data stored in the first storage system, the method comprising the steps of:

(A) disposing a second storage system at a location remote from a location of the first storage system;

(B) coupling the second storage system to the first storage system with a data communication line operable within a public communication network;

(C) communicating the at least some of the data stored in the first storage system over the data line from the first storage system to the second storage system using a protocol having fewer transactions per operation than the ESCON protocol; and (D) storing the at least some of the data communicated over the data line in the second storage system so that the second storage system mirrors the at least some of the data stored in the first storage system.

20. The method of claim 19, wherein the CPU and the first storage system communicate using the ESCON protocol.

21. The method of claim 19, wherein the CPU is a first CPU, and wherein the method further includes a step of coupling the second storage system to a second CPU.

22. The method of claim 19, wherein step (A) includes a step of disposing the second storage system at a location that is at least 80 km away from the location of the first storage system.

23. The method of claim 19, wherein the second storage system includes a buffer capable of simultaneously storing N data frames received from the first storage device over the data line, and wherein step (C) includes a step of communicating the at least some of the data stored in the first storage system over the data line in a single data transmission that includes a number of data frames greater than N.

24. The method of claim 19, wherein step (B) includes a data communication line selected from the family of T-carriers.

25. The method of claim 19, wherein step (C) includes a step of communicating data frames from the first storage system to the second storage system, wherein the second storage system includes a storage buffer capable of simultaneously storing no more than N data frames received over the data communication line from the first storage system, and wherein step (C) further includes steps of:

transmitting a request from the second storage system to the first storage system requesting that a number of data frames greater than N be transferred from the first storage system to the second storage system; and transmitting all of the number of requested data frames from the first storage system in a single data transmission.

26. The method of claim 25, wherein the second storage system is capable of processing data frames received over the data communication line from the first storage system at a maximum data processing rate, and wherein step (B) further comprises a step of implementing the data communication line with a transmission medium having a data frame transmission rate that is less than the maximum data processing rate of the second storage system.

27. The method of claim 25, wherein step (C) includes a step of transmitting the request in response to receipt of a command from the first storage system, the command instructing the second storage system that the first storage system will transmit the number of data frames to the second storage system.

28. The method of claim 27, wherein the command instructs the second storage system that the first storage system will transmit M data frames to the second storage system, wherein M is greater than N, and wherein step (C) includes steps of:

transmitting a single request from the second storage system to the first storage system requesting that all of the M data frames be transmitted from the first storage system to the second storage system; and transmitting, in response to the request, all of the M data frames from the first storage system in a single data transmission.

29. The method of claim 26, wherein step (B) includes a step of implementing the data communication link as one of the family of T-carriers.

30. The method of claim 19, wherein the first storage system and the CPU communicate using the ESCON protocol.

31. The method of claim 19, wherein step (C) includes a step of communicating data frames from the first storage system to the second storage system, the second storage system including a storage buffer capable of simultaneously storing no more than N data frames received over the data communication line from the first storage system, and wherein step (C) further includes a step of transmitting a number of data frames greater than N over the data communication line from the first storage system to the second storage system in a single data transmission.

32. The method of claim 31, wherein the second storage system is capable of processing data frames received over the data communication line at a maximum data processing rate, and wherein step (B) further includes a step of implementing the data communication line with a transmission medium having a data frame transmission rate that is less than the maximum data processing rate of the second storage system.

33. The method of claim 31, wherein the number of data frames is transmitted from the first storage system to the second storage system during execution of a command by the first storage system, the command requiring that a block of data including M data frames be transmitted from the first storage system to the second storage system, wherein M is greater than N, and wherein:

step (C) includes a step of transmitting all of the M data frames from the first storage system to the second storage system in the single data transmission.

34. The method of claim 32, wherein step (B) includes a step of implementing the data communication link as one of the family of T-carriers.

35. The method of claim 31, further including a step of, prior to step (C), transmitting the number of data frames from the CPU to the first storage system.

36. The method of claim 35, wherein the step of transmitting the number of data frames from the CPU to the first storage device includes transmitting the number of data frames in accordance with the ESCON protocol.

37. The computer system of claim 1, wherein the second storage system comprises:

a storage buffer capable of simultaneously storing no more than N data frames received over the communication link from the first storage system;

means for transmitting a request to the first storage system requesting that a number of data frames greater than N be transferred over the communication link from the first storage system to the second storage system; and receiving means for receiving all of the number of requested data frames from the first storage system in a single data transmission.

38. The computer system of claim 37, wherein the receiving means includes means for storing at least one of the N data frames in the storage buffer.

39. The computer system of claim 37, wherein the receiving means is capable of processing data frames received over the communication link at a maximum data processing rate, and wherein the communication link has a data frame transmission rate that is less than the maximum data processing rate of the receiving means.

40. The computer system of claim 37, wherein the second storage system includes means for receiving a command from the first storage system indicating that the first storage system will transmit the number of data frames to the second storage system; and wherein the means for transmitting the request to the first storage system is responsive to receipt of the command.

41. The computer system of claim 40, wherein the second storage system further includes means for transmitting a command response frame to the first storage system in response to receipt of the command, the command response frame indicating that the command was received by the second storage system.

42. The computer system of claim 41, wherein the second storage system further includes means for receiving an accept command response frame from the first storage system along with the number of requested data frames in the single data transmission, the accept command response frame indicating that the command response frame was received by the first storage system.

43. The computer system of claim 37, wherein the second storage system further includes means for transmitting a status of operation frame to the first storage system in response to receipt of a last of the number of requested data frames, the status of operation frame indicating the number of data frames received by the second storage system.

44. The computer system of claim 37, wherein the second storage system further includes:
   means for transmitting a command frame to the first storage system indicating a second number of data frames to be transmitted from the second storage system to the first storage system;
   means for receiving a command response frame from the first storage system indicating that the command frame was received by the first storage system;
   means for receiving a data request frame from the first storage system requesting that the second number of data frames be transmitted by the second storage system; and
   means for transmitting the second number of data frames in a second single data transmission in response to receipt of the data request frame.

45. The computer system of claim 44, wherein the second storage system further includes means for transmitting an accept command response frame to the first storage system in the second single data transmission, the accept command response frame preceding a first of the second number of data frames.

46. The computer system of claim 44, wherein the second storage system further includes:
   means for receiving a status of operation frame from the first storage system, the status of operation frame indicating a number of data frames received by the first storage system; and
   means for, when the number of data frames received by the first storage system matches the second number of data frames transmitted by the second storage system, transmitting a status accepted frame to the first storage system.

47. The computer system of claim 44, wherein the second storage system further includes means for transmitting the command frame to the first storage system along with the second number of data frames in the second single data transmission, the command frame indicating the number of data frames included in the second single data transmission.

48. The computer system of claim 44, wherein the transmitting of the second number of data frames is required by a first operation executed by the second storage system, and wherein the second storage system further includes:
   means for receiving a status of operation frame from the first storage system, the status of operation frame indicating that the second number of data frames was received by the first storage system;
   means for, after the status of operation frame is received, transmitting a status accepted frame to the first storage system indicating that the status of operation frame was accepted by the second storage system; and
   means for beginning execution of a second operation without awaiting receipt of an acknowledge frame from the first storage system indicating that the status accepted frame was received by the first storage system.

49. The computer system of claim 1, wherein the second storage system further includes:
   a storage buffer capable of simultaneously storing no more than N data frames received over the communication link from the first storage system;
   a transmitter that transmits a request to the first storage system requesting that a number of data frames greater than N be transferred over the communication link from the first storage system to the second storage system; and
   a receiver that receives all of the number of requested data frames from the first storage system in a single data transmission.

50. The computer system of claim 49, wherein the receiver stores at least one of the N data frames in the storage buffer.

51. The computer system of claim 49, wherein the receiver is capable of processing data frames received over the communication link from the first storage system at a maximum data processing rate, and wherein the communication link has a data frame transmission rate that is less than the maximum data processing rate of the receiver.

52. The computer system of claim 49, wherein the first storage system transmits a command indicating that the first storage system will transmit the number of data frames to the second storage system, and wherein the transmitter transmits the request to the first storage system in response to receipt of the command.

53. The computer system of claim 52, wherein the transmitter further transmits a command response frame to the first storage system in response to receipt of the command, the command response frame indicating that the command was received by the second storage system.

54. The computer system of claim 49, wherein the transmitter further transmits a status of operation frame to the first storage system in response to receipt of a last of the number of requested data frames, the status of operation frame indicating the number of data frames received by the second storage system.

55. The computer system of claim 49, wherein:
   the transmitter transmits a command frame to the first storage system indicating a second number of data frames to be transmitted from the second storage system to the first storage system; and
   the transmitter transmits the second number of data frames in a second single data transmission in response to receipt of a data request frame from the first storage system requesting that the second number of data frames be transmitted by the second storage system.

56. The computer system of claim 55, wherein the transmitter further transmits an accept command response frame to the first storage system in the second single data transmission, the accept command response frame preceding a first of the second number of data frames.

57. The computer system of claim 55, wherein the first storage system transmits a status of operation frame indicating a number of data frames received by the first storage system, and wherein when the number of data frames received by the first storage system matches the second number of data frames transmitted by the second storage system, the transmitter transmits a status accepted frame to the first storage system.

58. The computer system of claim 57, wherein the transmitter transmits the command frame to the first storage system along with the second number of data frames in the second single data transmission, the command frame indicating the number of data frames included in the second single data transmission.

* * * * *